(12) United States Patent
Hartmann et al.

(10) Patent No.: US 8,261,614 B2
(45) Date of Patent: Sep. 11, 2012

(54) ROTATIONAL SPEED SENSOR HAVING A COUPLING BAR

(75) Inventors: Bernhard Hartmann, Friedberg (DE); Stefan Günthner, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 392 days.

(21) Appl. No.: 12/281,699

(22) PCT Filed: Mar. 12, 2007

(86) PCT No.: PCT/EP2007/052304
§ 371 (c)(1),
(2), (4) Date: Nov. 20, 2008

(87) PCT Pub. No.: WO2007/104742
PCT Pub. Date: Sep. 20, 2007

(65) Prior Publication Data
US 2010/0037690 A1    Feb. 18, 2010

(30) Foreign Application Priority Data
Mar. 10, 2006 (DE) .................. 10 2006 011 572

(51) Int. Cl.
*G01C 19/56* (2012.01)
(52) U.S. Cl. .................................... 73/504.12
(58) Field of Classification Search ........... 73/504.12, 73/504.04, 504.14, 504.16
See application file for complete search history.

(56) References Cited

U.S. PATENT DOCUMENTS

| 5,728,936 | A | 3/1998 | Lutz |
| 5,767,405 | A | 6/1998 | Bernstein et al. |
| 6,230,563 | B1 | 5/2001 | Clark et al. |
| 6,282,955 | B1 | 9/2001 | Hulsing, II |
| 6,349,597 | B1 * | 2/2002 | Folkmer et al. ............ 73/504.02 |
| 6,761,068 | B1 * | 7/2004 | Schmid ...................... 73/504.14 |
| 6,829,937 | B2 * | 12/2004 | Mahon ....................... 73/514.29 |
| 2005/0072231 | A1 | 4/2005 | Chojnacki et al. |
| 2006/0021436 | A1 | 2/2006 | Kapser et al. |

FOREIGN PATENT DOCUMENTS

| DE | 195 30 007 C2 | 2/1997 |
| EP | 1 365 211 A1 | 11/2003 |
| EP | 1 416 250 A2 | 5/2004 |
| EP | 1 793 202 A2 | 6/2007 |
| WO | WO 03/104823 A1 | 12/2003 |
| WO | 2005103620 A1 | 11/2005 |
| WO | WO 2006/034706 A1 | 4/2006 |

* cited by examiner

*Primary Examiner* — John Chapman, Jr.
(74) *Attorney, Agent, or Firm* — RatnerPrestia

(57) ABSTRACT

A rotational speed sensor including at least one substrate, at least two base elements which each have a frame, a means for suspending the frame from the substrate, at least one seismic mass and one means for suspending the seismic mass from the frame. One or more drive means are provided for driving one or more base elements and one or more reading devices. The at least two base elements are coupled to one another by means of at least one coupling bar.

20 Claims, 12 Drawing Sheets

ROTATIONAL SPEED SENSOR HAVING A COUPLING BAR

CROSS-REFERENCE TO RELATED APPLICATIONS

This application is the U.S. national phase application of PCT International Application No. PCT/EP2007/052304, filed Mar. 12, 2007, which claims priority to German Patent Application No. DE102006011572.4, filed Mar. 10, 2006 and German Patent Application No. DE102007012163, filed Mar. 12, 2007, the contents of such applications being incorporated by reference herein in their entirety.

BACKGROUND OF THE INVENTION

1. Field of the Invention

The invention relates to a rotational speed sensor, a method for manufacturing a rotational speed sensor and to the use of the rotational speed sensor in motor vehicles.

2. Description of the Related Art

Rotational speed sensors are generally used to sense the angular speed of a system about a defined axis. An important field of application of rotational speed sensors is automobile engineering, for example in vehicle movement dynamics control systems such as the electronic stability program (ESP) or what is referred to as a rollover detection means. Such fields of application which are critical in terms of safety make particular requirements of rotational speed sensors in this context.

Document U.S. Pat. No. 6,230,563 B1 describes a Z axis rotational speed sensor which can therefore sense a rotational speed about its Z axis, the base area of its substrate being oriented parallel to the x-y plane (Cartesian coordinate system). This rotational speed sensor has two seismic masses which are coupled to one another by means of a coupling bar, wherein the coupling bar is suspended from the substrate by means of a torsion spring. The seismic masses are suspended directly from the substrate, with this suspension being embodied in such a way that it has to ensure the possibility of deflection of the seismic masses both for the drive and reading modes of the rotational speed sensor, as a result of which undesired crosstalk can occur between the two oscillation modes, which can have an adverse effect on the measurement.

Document WO 2006/034706 A1 proposes suspending the seismic masses from a frame which is itself suspended on the substrate. As a result, degrees of freedom of the suspension can be restricted in that, for example, the frame structure together with the seismic masses oscillates in the drive mode but in the reading mode only the seismic masses oscillate, as a result of which crosstalk between the two oscillation modes can be largely avoided. However, the coupling of the seismic masses by means of the proposed coupling unit is sensitive to parallel interference excitations in the measuring direction, such as, for example, shocks.

SUMMARY OF THE INVENTION

An object of the present invention is to avoid or reduce parasitic modes and interference deflections of the seismic masses.

According to one aspect of the invention, the object is achieved by a rotational speed sensor and a method for manufacturing a rotational speed sensor, as described herein.

The invention relates to the idea that the rotational speed sensor has at least two base elements which each comprise an open or closed frame, a means for suspending the frame from the substrate, at least one seismic mass and one means for suspending the seismic mass from the frame. In addition, at least two base elements are coupled to one another by means of at least one coupling bar.

The reading devices are preferably provided for sensing deflections of the seismic masses and/or the frames, and the seismic masses and/or the frames correspondingly each have at least one means for sensing deflections which is/are respectively assigned to at least one reading device.

The coupling of the coupling bar can expediently be formed to each part of the base element, such as for example a seismic mass, the frame and/or a suspension element/spring element.

A substrate is understood here to be a base body and/or carrier body and/or housing part of the rotational speed sensor which is, in particular, an essentially unstructured part of the wafer from which the rotational speed sensor is formed. The substrate is particularly preferably composed of crystalline or polycrystalline silicon or of one or more layers of semiconductor material and/or metal or metals.

A frame is understood to be an open and/or closed frame which encompasses, in particular, one or more seismic masses at least on three sides and particularly preferably has an essentially rectangular inner circumference and outer circumference. The frame very particularly preferably at least partially encloses at least one seismic mass with respect to a plane.

A spring element is preferably a torsion spring element or a spiral spring element or a spring element which is both flexible and can be subjected to torsion.

A drive mode or primary mode is understood to be a natural mode of a rotational speed sensor, preferably the natural oscillation, particularly preferably the oscillation with a resonant frequency, of the at least two base elements in which the base elements of the rotational speed sensor oscillate, in particular without a rotational speed having an effect.

A reading mode or secondary mode is understood to be a natural mode which preferably occurs on the basis of a rotational speed and the associated effect of the Coriolis force.

The rotational speed sensor is preferably manufactured by means of surface micromechanics. In this context, the structures are etched into a diaphragm material, in particular silicon, particularly preferably using anisotropic dry etching essentially perpendicularly through the diaphragm. The plane of the base area of the diaphragm extends essentially parallel to the substrate surface. At the locations where the diaphragm is permanently connected to the substrate underneath it, anchoring points are produced at which, in turn, either spring elements or nonmoveable structures are attached. As a result, rigid bodies, which are suspended on springs, can be implemented in a freely oscillating fashion. The anchoring points are very particularly preferably electrically insulated from one another by means of insulating layers, and contact can be made with them from the outside.

The substrate is expediently composed of silicon, and the diaphragm is composed, in particular, of a conductive polycrystalline silicon or also from crystalline silicon.

The substrate plane or the base area of the substrate is preferably oriented in such a way that it is oriented parallel to the x-y plane of a Cartesian coordinate system. The z axis of this coordinate system extends perpendicularly to the substrate plane. The coordinate axes can, in particular, be displaced in parallel with respect to the formation and arrangement of components of the rotational speed sensor.

A drive means is preferably understood to be a comb drive with two combs which engage one in the other and are essentially electrically insulated from one another, one of which combs is connected to at least one base element and the other to the substrate. By applying different voltages to these combs it is possible to move them with respect to one another. In particular the drive mode is generated using at least one drive means.

A reading device is expediently understood to be a device which has at least two electrodes or other electrical/electronic elements whose capacitance/changes in capacitance in combination and/or their difference potential with respect to one another is measured. In particular, such a reading device has comb structures which engage one in the other and are essentially electrically insulated from one another, one of which is attached to the base element, particularly preferably to the frame and/or one or more seismic masses, and/or to the coupling bar, and the other to the substrate. Alternatively or additionally, a reading device has, in particular, a pair of electrodes.

The at least one drive means expediently drives the at least two base elements in the y direction, wherein the rotational speed sensor is configured in such a way that it can sense rotational speeds about the x axis and/or z axis. These configurations are particularly favorable in terms of measurement technology since it is possible to sense deflections of the seismic masses which occur due to the Coriolis force. The Coriolis force acts perpendicularly to the driving direction and perpendicularly to the rotational axis.

It is preferred that the coupling bar is suspended from at least one spring element which is suspended in particular from the substrate and/or clamped and/or attached to it in order to form at least one anchoring point with the latter, and particularly preferably two anchoring points. In this context, this spring element is embodied and clamped in in such a way that it prevents translatory deflections of the coupling bar, in particular with respect to its center of gravity. This measure prevents and/or suppresses interference deflections/oscillations which in some cases have very adverse effects on the measurement.

It is expedient that the spring element from which the coupling bar is suspended alternatively and/or additionally has an anchoring point on a body or part of the rotational speed sensor which is different from the substrate.

The coupling bar is preferably suspended from the at least one spring element essentially with respect to its center of gravity. In particular, this center of gravity is simultaneously the center point of the coupling bar with respect to its length.

It is expedient that the spring element from which the coupling bar is suspended is a torsion spring which permits a rotational deflection of the coupling bar about the z axis and/or the x axis. In particular, this torsion spring is of rigid design in the x and/or y and/or z directions, particularly preferably in all three spatial directions. As a result, the degrees of freedom of the coupling bar are reduced in a targeted fashion and interference deflections and/or interference oscillations of the seismic masses can be reduced or suppressed by means of this common coupling with reduced degrees of freedom.

The center of gravity of the coupling bar preferably coincides essentially with the center of gravity of the rotational speed sensor, in particular in each case with respect to the x-y plane. As a result, the center of gravity of the coupling bar remains still while the seismic masses oscillate.

The coupling bar is very particularly preferably suspended from two or more spring elements as described above.

The coupling bar is expediently coupled at each of its ends to one or more seismic masses and/or one, two or more reading devices and/or one or more frames, by means of one or more spring elements or directly. By means of such special coupling between the coupling bar and the seismic mass, it is possible to limit additional degrees of freedom and/or to guide the movement in such a way that interference oscillations/deflections can be avoided or suppressed. Correspondingly, interference deflections or interference oscillations in the reading mode and/or drive mode are prevented or reduced.

It is preferred that the seismic masses are each suspended so as to be deflectable about a torsion axis, and this torsion axis extends essentially parallel to the driving direction. As a result, it is largely possible to avoid the drive modes influencing the reading modes. Crosstalk between these modes is therefore prevented.

Two or more of the seismic masses, in particular all of them, preferably have a center of gravity which lies in the z direction outside the plane extending through the respective frame and/or outside the right parallelepiped. Particularly preferably one side of each seismic mass, very particularly preferably the lower side, is of convex design in the z direction. As a result, it is possible to sense a rotational speed, for example about the z axis, which causes a Coriolis force which acts in the direction of the plane of the frame since, due to the center of gravity which has been moved out, a force component still acts in the z direction.

Each of the seismic masses is expediently assigned a reading device, as a result of which the deflections/oscillations of the seismic masses can be taken into account individually with respect to signal evaluation and/or signal processing.

It is essentially preferred to determine the sensed rotational speed from the difference signal of the reading devices which are each assigned to the individual seismic masses of a base element, and from the difference signal of the reading devices which are assigned to different base elements.

A rotational speed sensor which can sense a rotational speed about the x axis is preferably embodied in such a way that the base elements are driven in the y direction, wherein the frames of the base elements are each suspended from the substrate by means of spring elements which are essentially rigid in the x direction and z direction and elastic in the y direction, the seismic masses of each base element are suspended from the respective frame by means of spring elements which essentially, in particular exclusively, permit torsion about the y axis and/or are elastic in the z direction, and the coupling bar is suspended from the substrate by means of a torsion spring which, in particular exclusively, permits torsion about the x axis and is rigid in the x and y directions, is suspended on the substrate and is coupled at each of its two ends to the seismic masses of, in each case, one base element by means of spring elements.

It is expedient that a rotational speed sensor which can sense a rotational speed about the z axis and/or about the x axis and z axis is embodied in such a way that the base elements are driven in the y direction, wherein the frames of the base elements are each suspended from the substrate by means of spring elements which are essentially rigid in the x and z directions and elastic in the y direction, the seismic masses which particularly preferably have a center of gravity which lies in the z direction outside the plane extending through the respective frame and/or outside the right parallelepiped, of each base element are suspended from the respective frame by means of spring elements which, in particular exclusively, essentially permit torsion about the y axis and/or are elastic in the z direction, and the coupling bar is suspended from the substrate by means of a torsion spring which, in particular exclusively, permits torsion about the x axis and is rigid in the x and z directions, and at each of its two ends a separate part of the coupling bar is coupled to the central piece of the coupling bar by means of a torsion spring which is essentially rigid in the x, y and z directions and permits torsion about the y axis, wherein these two outer separate parts of the coupling bar are each coupled to the seismic masses of, in each case, one base element by means of spring elements.

It is preferred that a rotational speed sensor which can sense a rotational speed about the x axis and the z axis is embodied in such a way that the base elements are driven in the y direction, wherein the frames of the base elements are each suspended from the substrate by means of spring elements which are essentially rigid in the z direction and elastic in the y and x directions, the seismic masses of each base element are suspended from the respective frame by means of spring elements which essentially, in particular exclusively, permit torsion about the y axis and/or are elastic in the z direction, and the coupling bar is suspended from the substrate by means of a torsion spring which permits torsion about the x axis and the z axis and is rigid in the x and z directions, and is coupled at each of its two ends to the seismic masses of, in each case, one base element by means of spring elements.

The rotational speed sensor is preferably embodied as a micro-electric mechanical system (MEMS) or MEMS module which has, in particular, mechanical and electronic means for connecting to and/or interacting with further MEMS modules and/or with at least one electronic signal processing circuit which is in particular an integrated circuit.

As an alternative preference the base elements of the rotational speed sensor are embodied as solid seismic masses which therefore in particular do not have a frame. This embodiment of the base elements and seismic masses relates in a particularly preferred fashion to all the embodiments of the rotational speed sensor.

The invention additionally relates to a method for manufacturing a rotational speed sensor, wherein micromechanical elements are formed by means of a manufacturing process for manufacturing micromechanical systems from a substrate which is composed, in particular, of crystalline silicon or one or more layers of semiconductor material and/or metal or metals, wherein a rotational speed sensor as described above, particularly preferably in accordance with one of the exemplary embodiments is formed at least in parts.

The rotational speed sensor, according to aspects of the invention, is provided for use in motor vehicles, in particular in a motor vehicle control system.

The rotational speed sensor described above can be used in different areas for acquiring one or more rotational speeds and/or for acquiring one or more rotational accelerations using corresponding signal processing means. In this context, the use in vehicles and in automation technology is preferred, in particular in motor vehicles and aircraft, particularly preferably in the respective corresponding control systems. The use of the rotational speed sensor as a yaw rate and/or yaw acceleration sensor in a motor vehicle control system, for example ESP, is very particularly preferred.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1A:
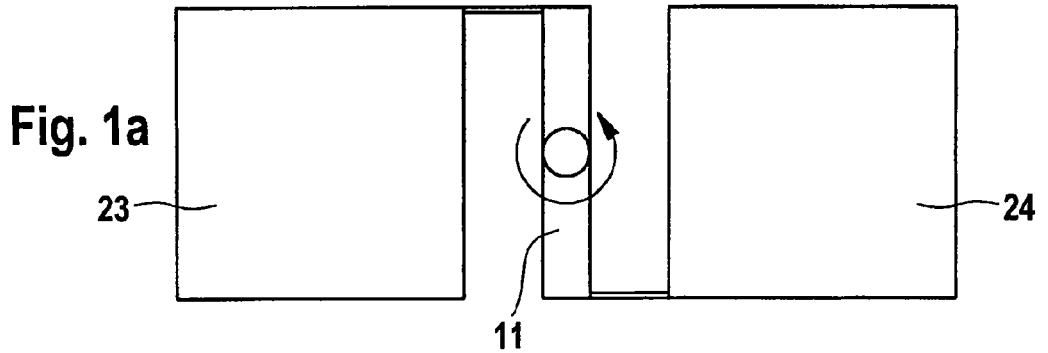
FIG. 1 shows an exemplary embodiment of a rotational speed sensor, having two seismic masses which are suspended from the substrate and which are coupled via a coupling bar, and the latter suppresses parasitic modes of the drive mode.
Figure 1B:
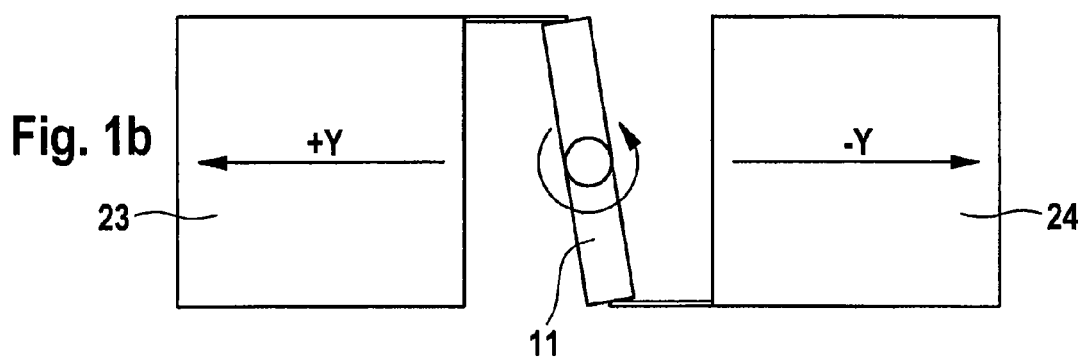
Figure 1C:
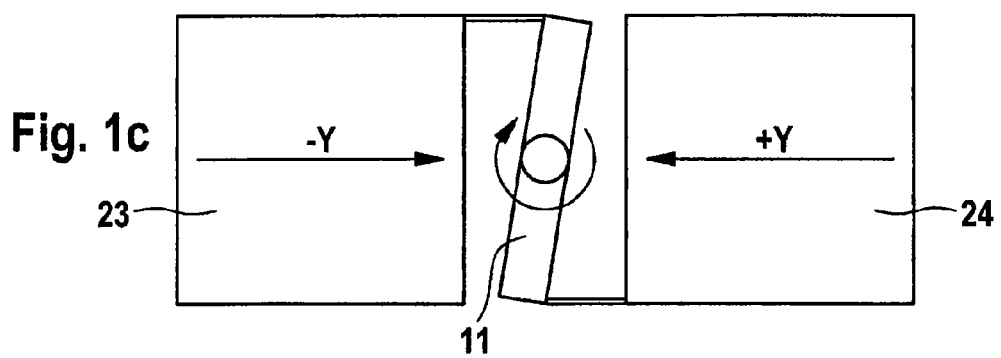
Figure 1D:
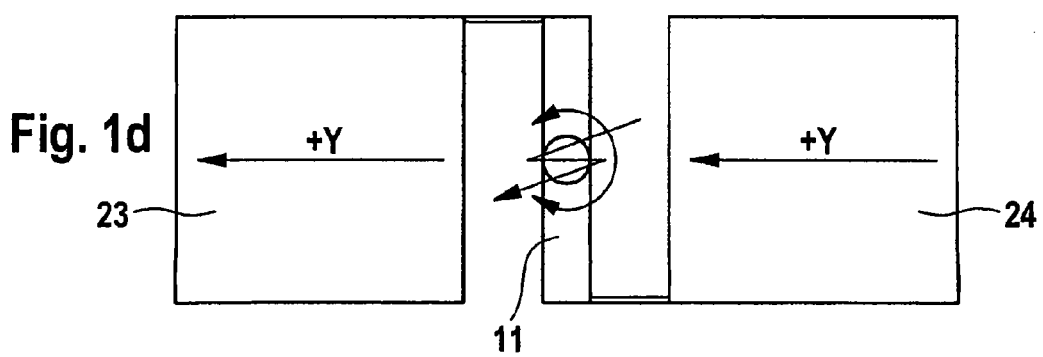

FIG. 1a shows the suspension diagram of a rotationally suspended rigid coupling bar 11 which suppresses or prevents undesired common-phase deflections of the seismic masses 23 and 24 in the drive mode. In the drive mode, seismic masses 23 and 24 oscillate with respect to one another in antiphase in the y direction. FIG. 1*b* illustrates here the method of functioning of the coupling bar as the seismic masses move apart from one another, while FIG. 1*c* shows the corresponding coupling principle when the seismic masses 23 and 24 move toward one another. When the seismic masses 23 and 24 move apart from one another or toward one another, the coupling bar 11 is therefore deflected rotationally, specifically about the z axis. FIG. 1*d* illustrates the method of functioning of the coupling bar 11 in the case in which the seismic masses 23 and 24 wish to move in the same direction, in this case both wish to move in the y direction to the left, owing, for example, to interference. This movement is prevented or suppressed by a bar element 11 owing to a means of suspension which is of rigid configuration in the y direction. In FIGS. 1*a* to 1*d* the seismic masses are, for example, not suspended directly from a frame as in an additional example (not illustrated), but rather directly from the substrate.

Figure 2:
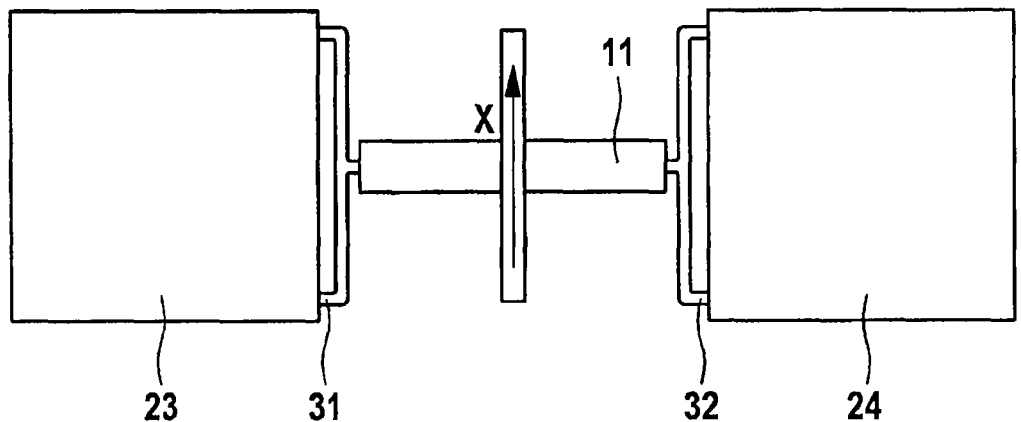
FIG. 2 shows an exemplary rotational speed sensor whose coupling bar can be subjected to torsion about the x axis, and the connection of the coupling bar to the seismic masses by means of spring elements.

In the exemplary embodiment according to FIG. 2, the coupling bar 11 is suspended in such a way that it can be deflected in a rotational fashion about the x axis. In this context, the coupling bar 11 is suspended with respect to its center of gravity and point of symmetry, and its center of gravity is essentially identical to that of the rotational speed sensor. As a result, the coupling bar 11 remains essentially still with respect to its center of gravity when a rotational speed is sensed. Seismic masses 23 and 24 are, for example, suspended directly from the substrate. The spring elements 31 and 32 are embodied and configured in such a way that they permit torsional deflection in the opposite direction, in each case between the two seismic masses 23 and 24 and coupling bar 11. The driving direction runs in the y direction (corresponding to a Cartesian coordinate system).

In one example (not illustrated) according to FIG. 2, the seismic masses are each suspended from a frame which is itself respectively suspended from the substrate by means of spring elements.

Figure 3:
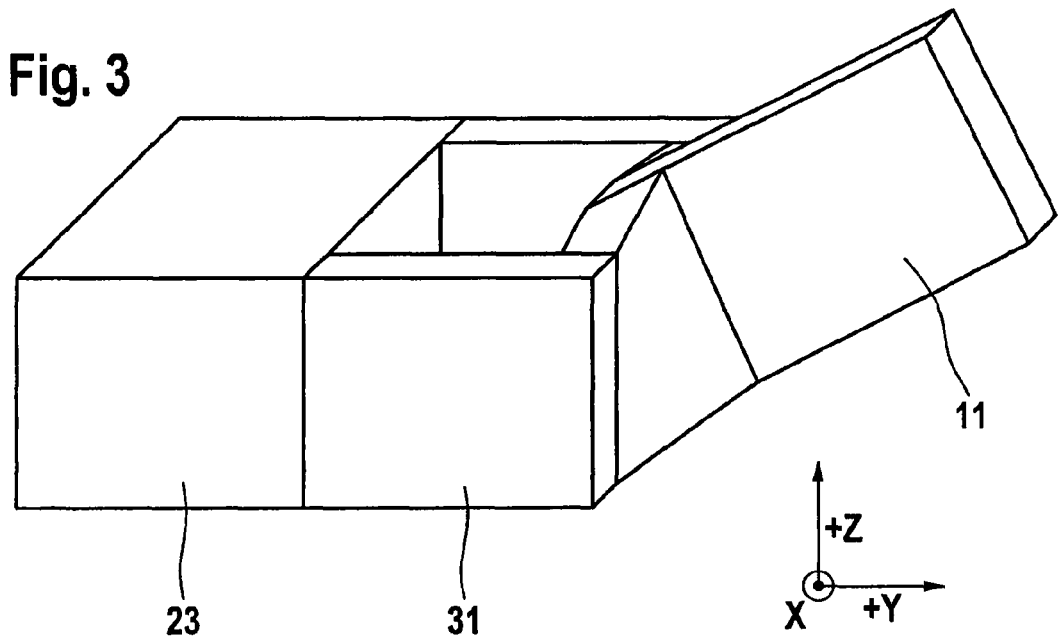
FIG. 3 shows an exemplary illustration of the spring connection between a seismic mass and coupling bar.

Exemplary spring elements 31 and 32 according to FIG. 2 are illustrated in their schematic embodiment in FIG. 3. Here, the spring element 31 between the seismic mass 23 and coupling bar 11 is deflected in the y and z directions because the coupling bar 11 experiences a torsional deflection about the x axis.

Figure 4:
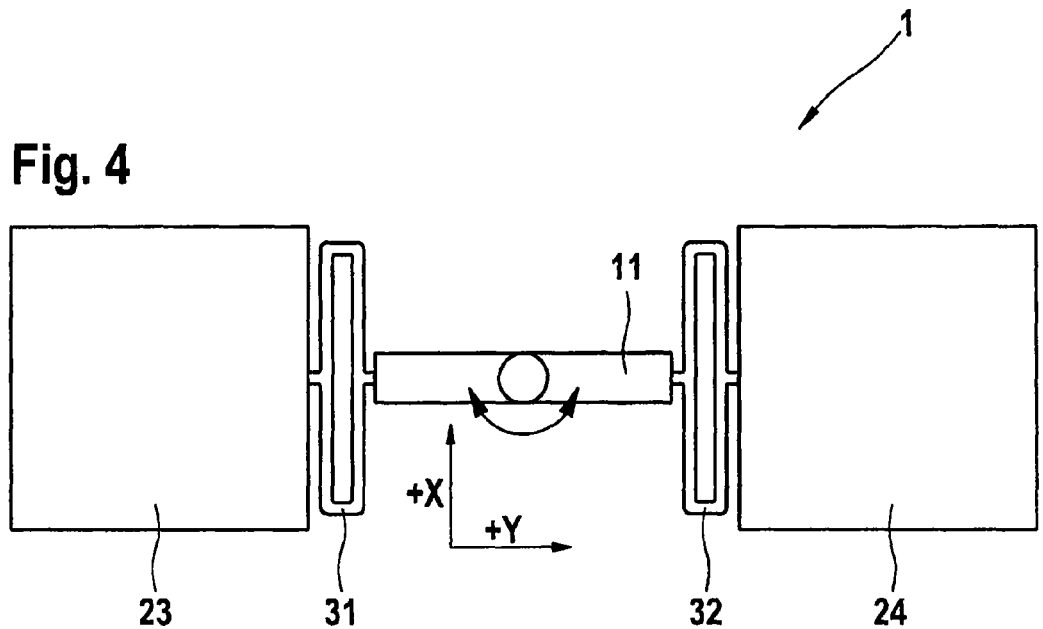
FIG. 4 shows an exemplary z-axis rotational speed sensor with seismic masses without a frame.

FIG. 4 illustrates an exemplary Z gyroscope, that is to say a rotational speed sensor which can experience a rotational speed about the z axis. The seismic masses 23 and 24, which are for example suspended directly from the substrate and in an alternative example (not illustrated) are respectively suspended from a frame which is itself respectively suspended from the substrate, are coupled to one another by means of the coupling bar 11, which is respectively connected to the seismic masses by means of spring elements 31 and 32. The coupling bar 11 is suspended in such a way that it can be deflected in a rotational fashion about the z axis, but this means of suspension is rigid in the x and y directions. In the case of interference or interference excitation acting in the same direction on both masses, an undesired translatory deflection of the seismic masses 23 and 24 in the same direction is suppressed by the coupling bar 11 and its suspension means. The coupling bar 11 exclusively permits seismic masses 23 and 24 to be deflected in antiphase. Parasitic modes are suppressed with the exemplary embodiment of the rotational speed sensor 1.

In one exemplary embodiment (not illustrated), both seismic masses are suspended from a frame which is itself suspended in each case from a substrate.

Figure 5:
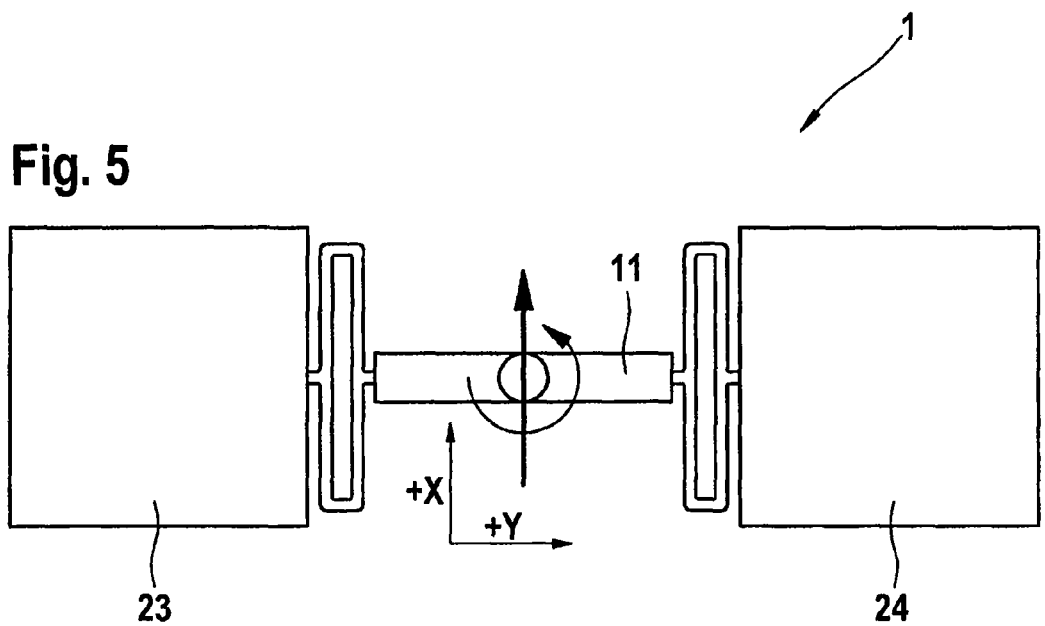
FIG. 5 shows an exemplary embodiment of an X-Z axis rotational speed sensor with seismic masses without a frame.

FIG. 5 shows an exemplary X-Z gyroscope, that is to say a rotational speed sensor which can measure rotational speeds about both the x and z axes. The coupling bar 11 serves to suppress undesired oscillations and deflections in the reading modes, in which case the coupling bar 11 is suspended in such a way that it can be deflected in a rotational fashion about the x and z axes. For example, the coupling bar 11 is suspended from the substrate by means of a spring element, wherein the means for suspending the coupling bar acts essentially on its center of gravity, and this center of gravity corresponds essentially to the center of gravity of the entire rotational speed sensor 1.

Figure 6A:
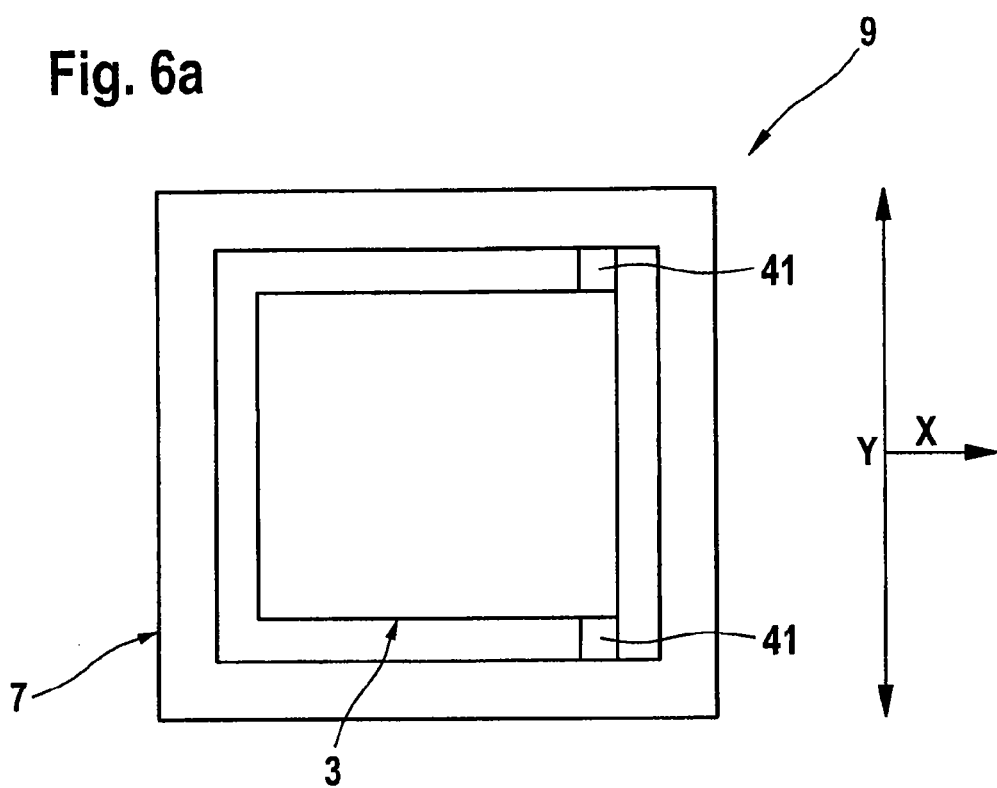
FIG. 6 shows two embodiments of base elements with a seismic mass, suspended from the frame on a torsion spring in one case and on a spiral spring in the other.

FIGS. 6*a* and *b* are exemplary base elements 9 shown in a plan view. They are each composed of a closed frame 7 and of a seismic mass 3 which are respectively suspended from the frame 7 by means of spring elements 41, 42. The drive is provided in the y direction. In the base element shown in FIG. 6*a*, the two spring elements 41 are of rigid design in the x, y and z directions and only permit torsion about the y axis. Alternatively, the two spring elements 42 of the base element 9 which is shown in FIG. 6*b* are of exclusively flexible design in the z direction and otherwise have essentially no degrees of freedom.

Figure 7A:
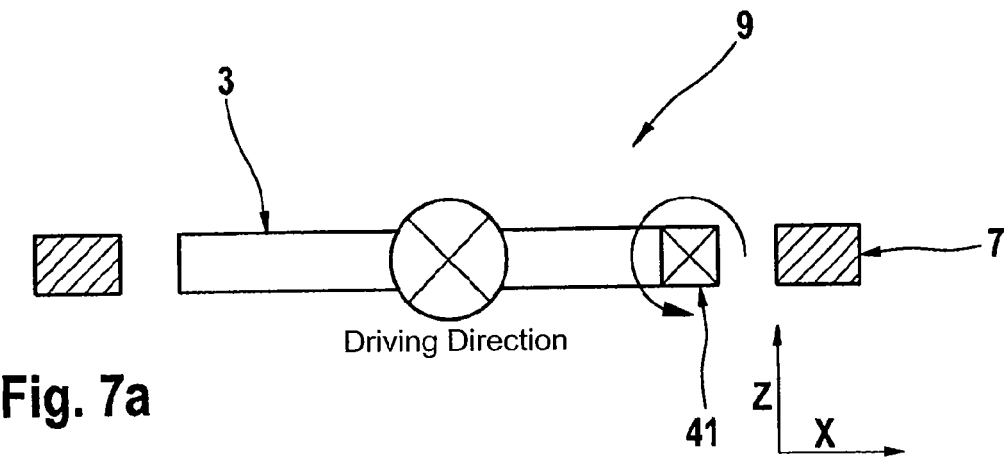
FIG. 7 is an illustration of the forces and deflections when different rotational speeds act, using an exemplary base element.
Figure 7B:
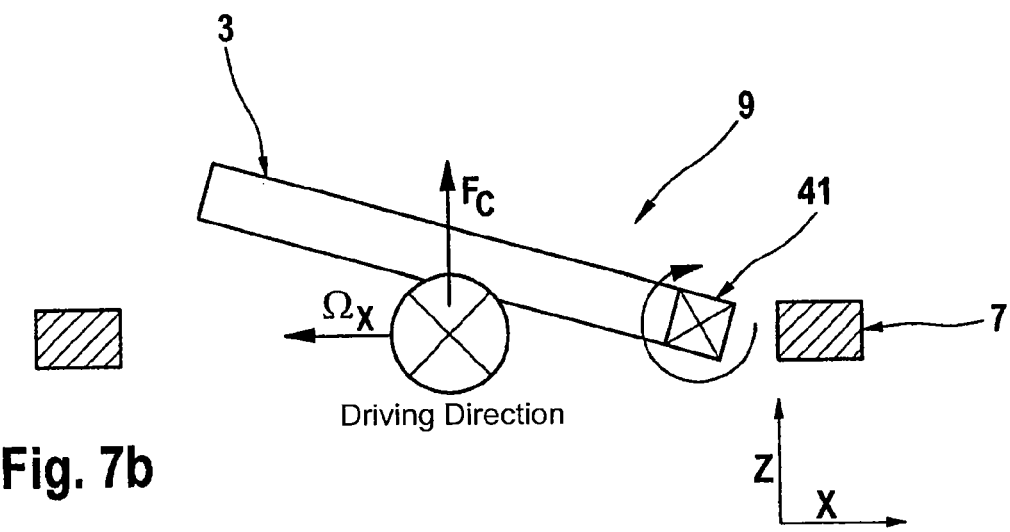
Figure 7C:
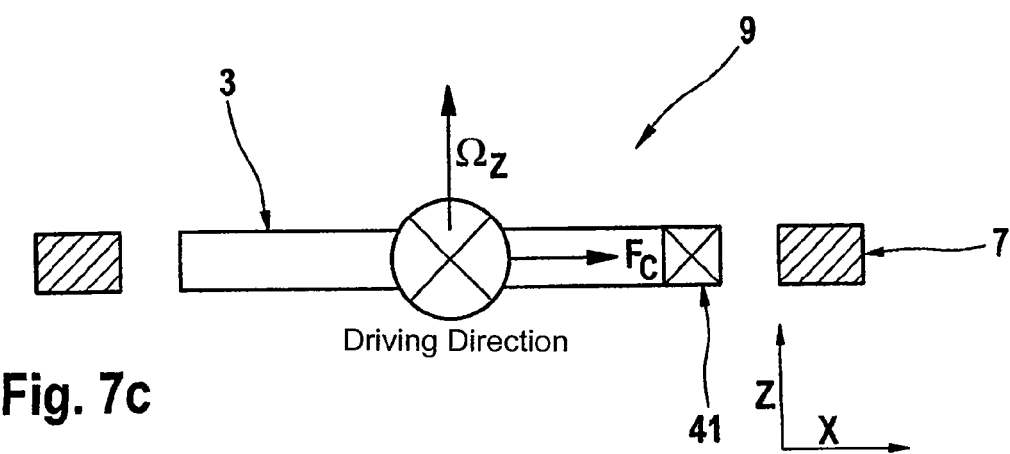

FIG. 7*a* shows the schematic cross section through the exemplary base element 9 according to FIG. 6*a*. The seismic mass 3 is suspended from the frame 7 by means of torsion spring element 41, in which case the seismic mass 3 can execute a torsional deflection about the y axis. In FIG. 7*b*, the above base element 9 is illustrated when a rotational speed about the x axis occurs. The rotational speed about the x axis is illustrated by $\Omega_x$ in the x direction. Due to the driving direction in the y direction and the rotational speed $\Omega_x$ about the x axis, a Coriolis force $F_c$ is produced in the z direction which deflects the base element 3 in the z direction in the illustrated fashion. The means for suspending base element 3 by means of the torsion spring 41 permits here a torsional deflection about the y axis. In FIG. 7*c*, the occurrence of a rotational speed about the z axis is also illustrated with respect to the exemplary base element 9 above. Due to this rotational speed $\Omega_z$ and the driving direction in the y direction, a Coriolis force $F_c$ is produced in the x direction. However, this does not lead to a deflection of the seismic mass 3 because $F_c$ acts in the plane (x-y plane) of the frame, and the torsion spring elements 41 are of rigid design in the x and y directions.

Figure 8A:
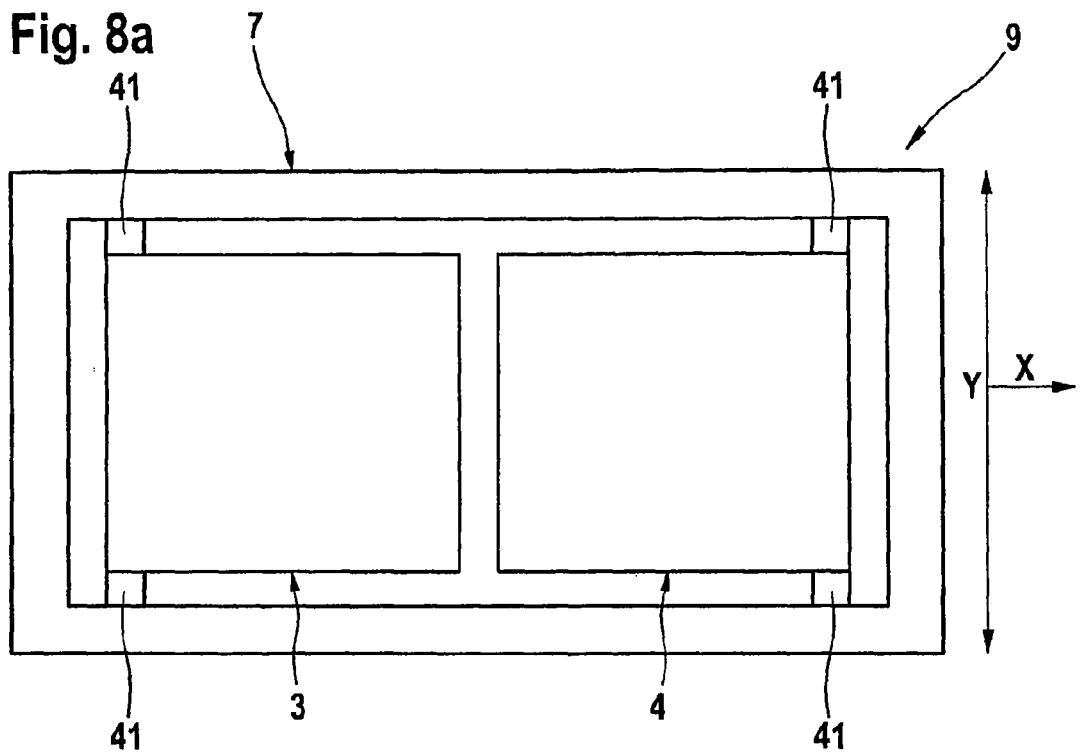
FIG. 8 shows an exemplary embodiment of a base element with two seismic masses, and the effects of an x rotational speed and of a z rotational speed on these seismic masses.

FIG. 8*a* illustrates an exemplary embodiment of a base element 9 in plane view, which exemplary embodiment has two seismic masses 3 and 4 which are each suspended from the frame 7 at two torsion spring elements 41. These torsion spring elements 41 are embodied in such a way that they essentially exclusively permit torsional deflections of the seismic masses 3 and 4 about the y axis.

Figure 6B:
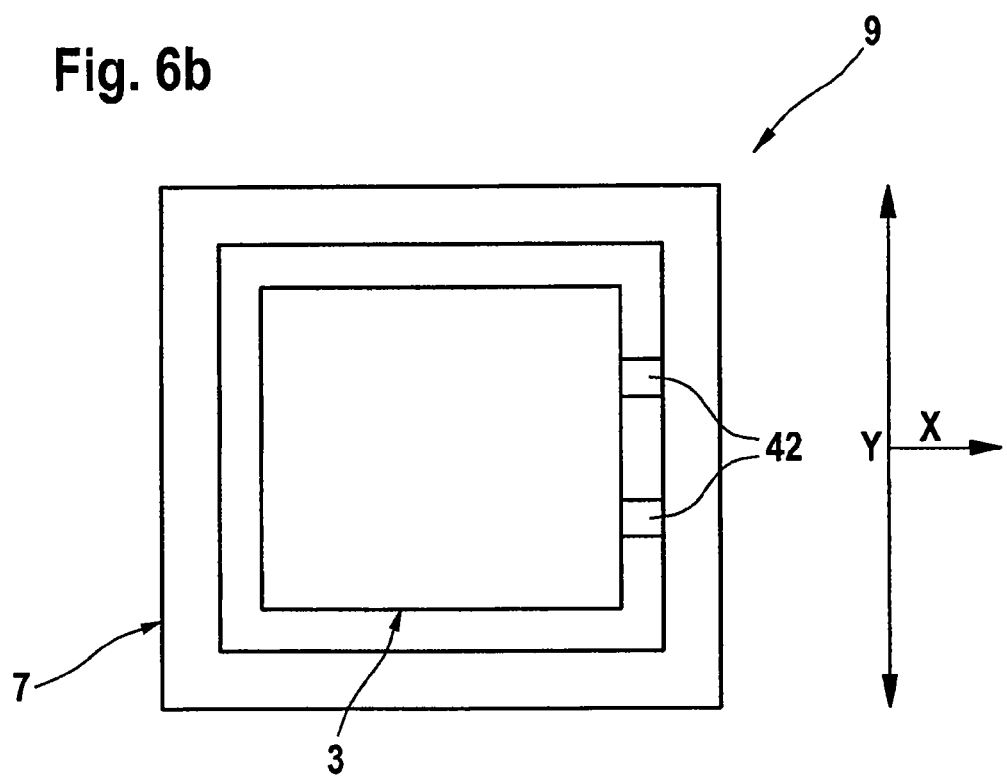

In an alternative exemplary embodiment (not illustrated), the seismic masses are suspended from spring elements as per FIG. 6*b* which essentially exclusively permit deflection in the z direction, that is to say are embodied as spiral springs.

Figure 8B:
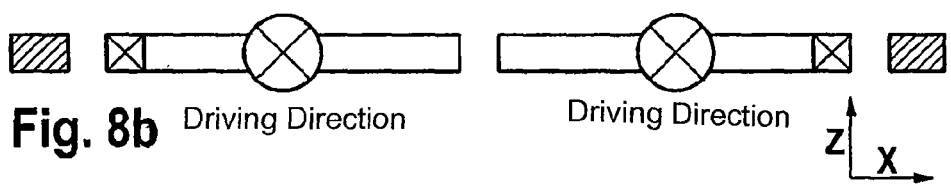
Figure 8C:
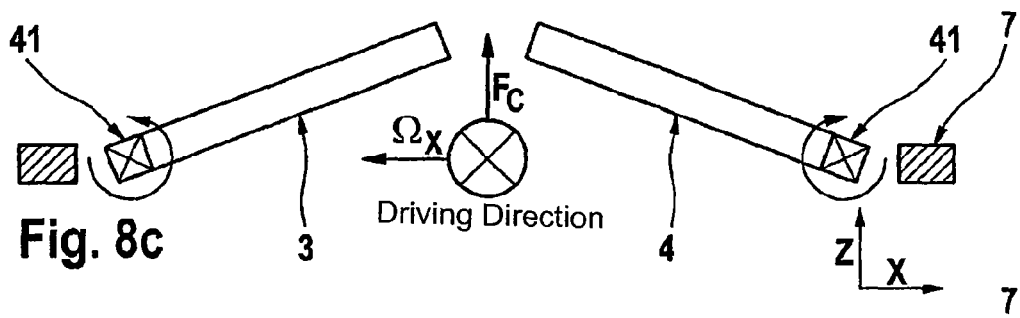
Figure 8D:
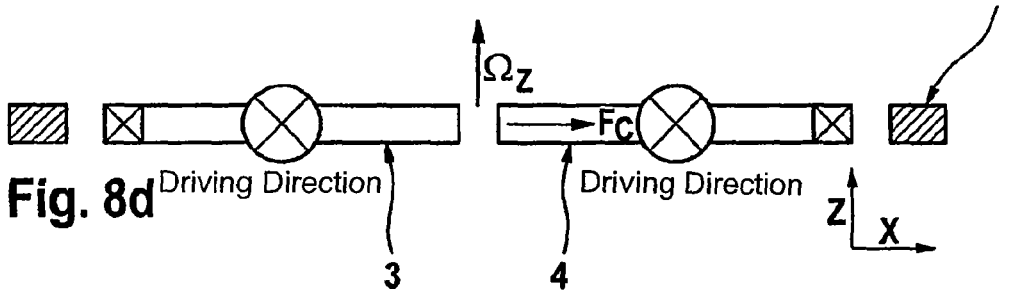

FIG. 8*b* shows the schematic cross section of the exemplary base element according to FIG. 8*a* in the undeflected state. FIG. 8*c* illustrates the deflection of seismic masses 3 and 4 when a rotational speed $\Omega_x$ about the x axis occurs. Owing to the driving direction (y direction) and rotational speed $\Omega_x$, a Coriolis force $F_c$ is produced in the z direction, which causes deflection of the two seismic masses 3 and 4 in the z direction with the same orientation. In this context, the torsion spring elements 41 with which seismic masses 3 and 4 are suspended from the frame 7 are each subjected to torsion about the y axis. FIG. 8d illustrates the effect of the Coriolis force $F_c$ owing to a rotational speed $\Omega_z$ about the z axis on the exemplary base element above. Owing to the direction of the effect of the Coriolis force in the x-y plane in which the frame 7 is also located and the means of suspension which is of rigid design in these directions, seismic masses 3 and 4 do not experience any deflection.

Figure 9A:
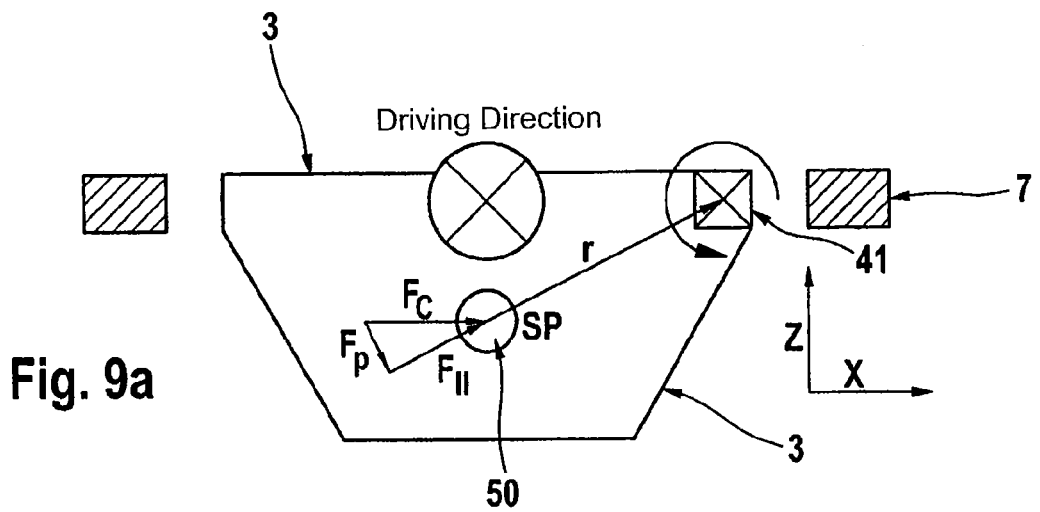
FIG. 9 shows an exemplary seismic mass with a center of gravity which has been moved out, and the force relationships when a rotational speed occurs.
Figure 9B:
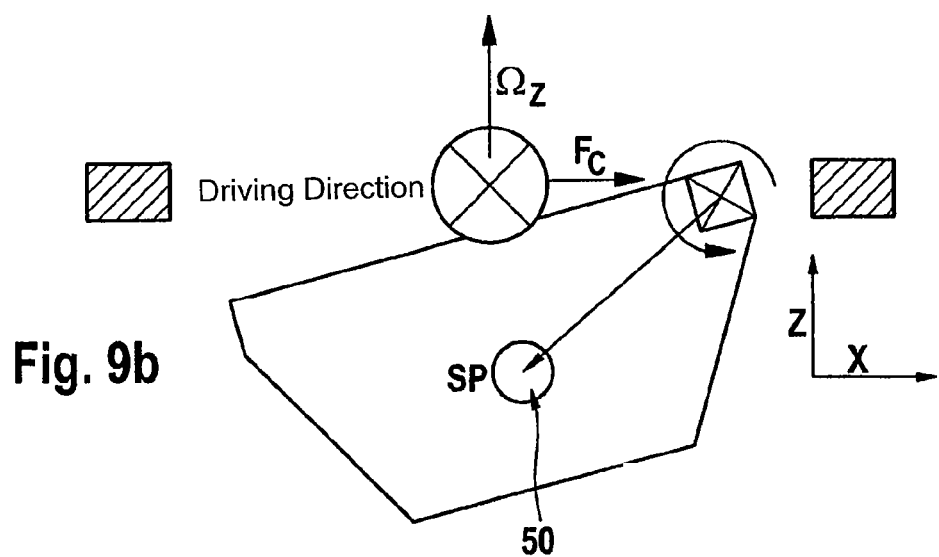
Figure 9C:
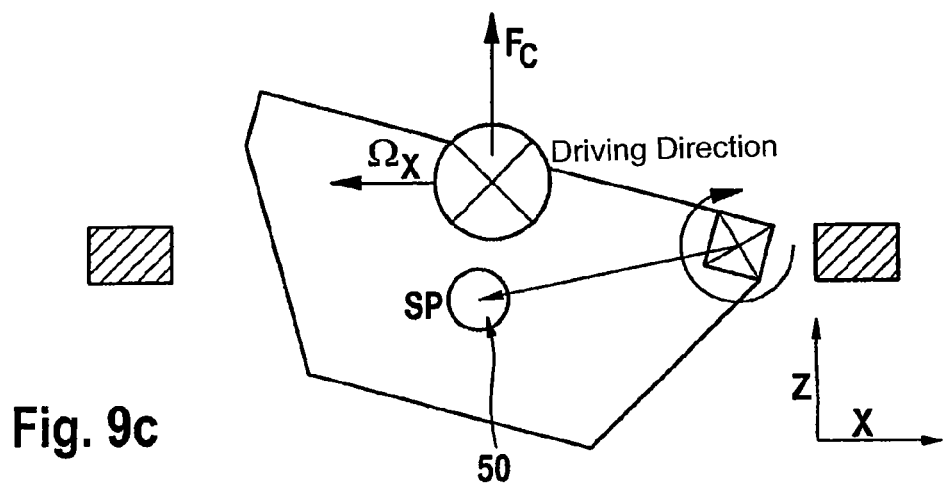

FIGS. 9a to c illustrate an alternative exemplary embodiment of a base element in a schematic cross section. The seismic mass 3 is respectively embodied here in such a way that in the undeflected state the center of gravity 50 of the seismic mass 3 lies outside the plane extending through the frame or outside the space extending through the frame body. For example, the seismic mass 3 is embodied in such a way that the center of gravity 50 lies in the z direction underneath the frame region. The seismic mass 3 is embodied essentially homogeneously from one material, with the lower side of the seismic mass 3 being of convex design and the center of gravity 50 with respect to the upper flat sides being moved away from a suspension point by an angle of essentially 45°. The seismic mass 3 is suspended on one side from the frame 7 with two torsion spring elements 41 which permit torsion about the y axis. FIG. 9a illustrates that a Coriolis force $F_c$ which acts in the x direction generates a torque about the y axis owing to the center of gravity of the seismic mass 3 which has been moved out. FIG. 9b shows the downward deflection of the seismic mass 3 in the z direction, caused by a rotational speed $\Omega_z$ about the z axis. This rotational speed $\Omega_z$ and the driving direction in the y direction results in a Coriolis force $F_c$ in the x direction, which according to FIG. 9a generates a torque about the y axis. FIG. 9c illustrates an upward deflection of the seismic mass 3 in the z direction, caused by a rotational speed $\Omega_x$ about the x axis. This rotational speed and the drive in the y direction result in a Coriolis force in the z direction, said Coriolis force deflecting the seismic mass 3.

Figure 10A:
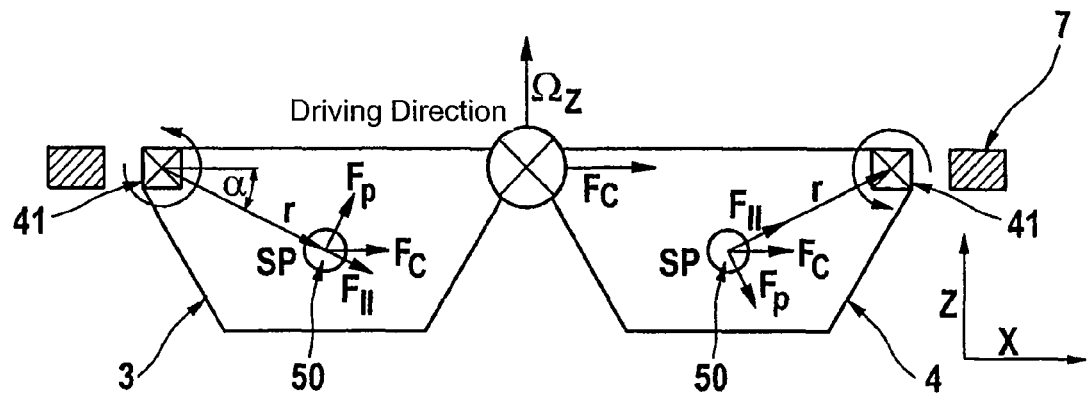
FIG. 10 shows an exemplary embodiment of a base element with two seismic masses with a center of gravity which has been moved out, and the force relationships when a rotational speed occurs.
Figure 10B:
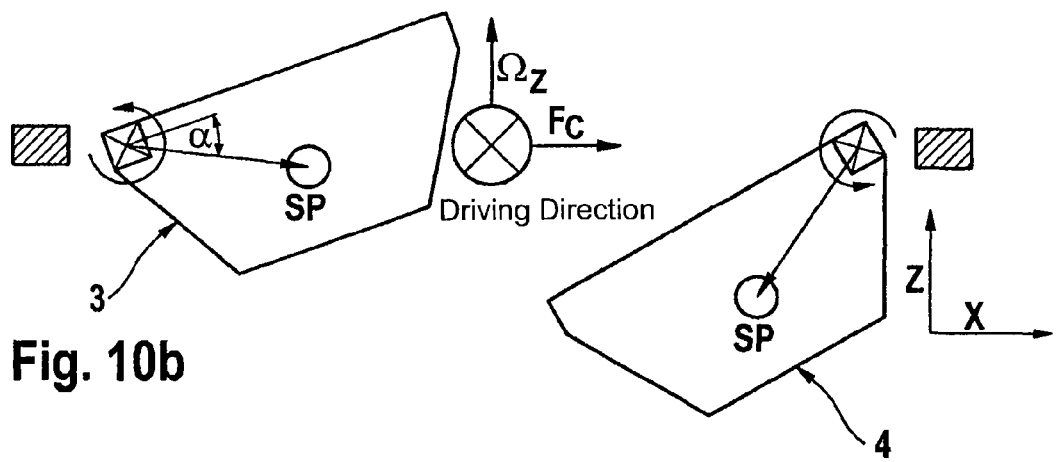
Figure 10C:
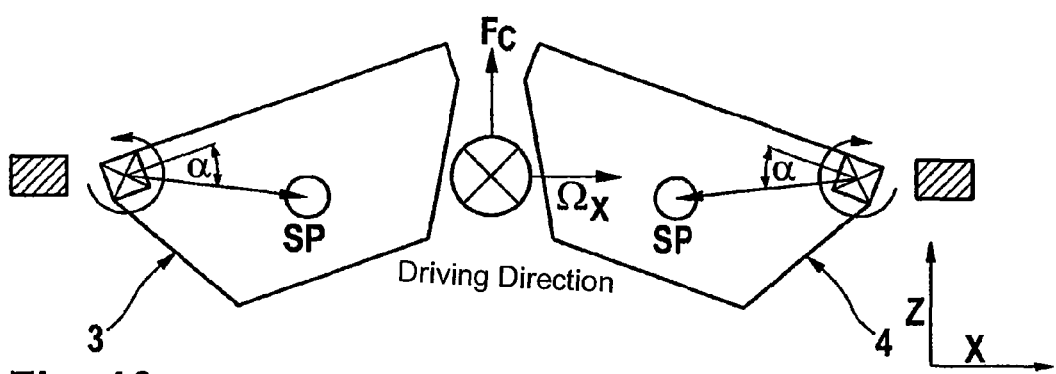
Figure 11A:
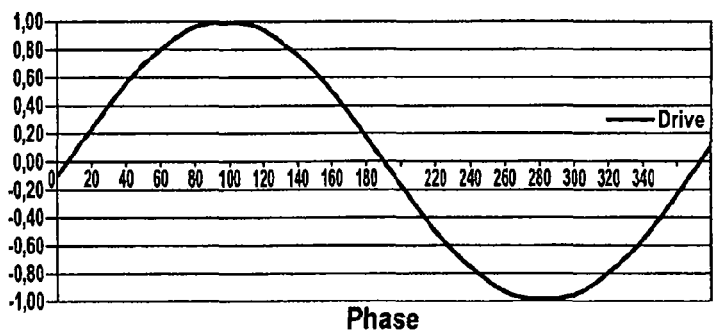
FIG. 11 shows various exemplary signal profiles relating to the phase of an exemplary base element.
Figure 11B:
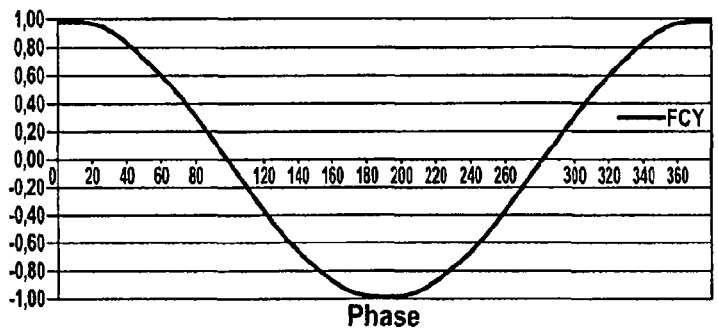
Figure 11C:
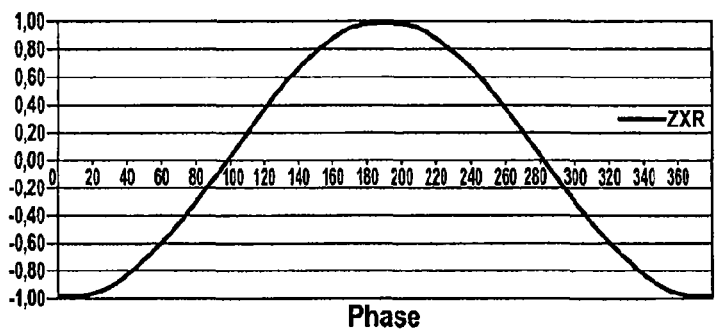
Figure 11D:
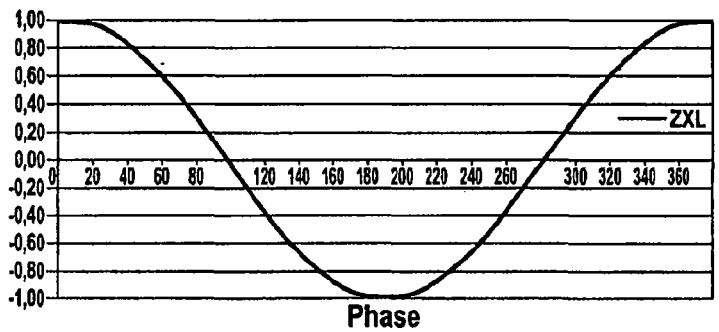
Figure 11E:
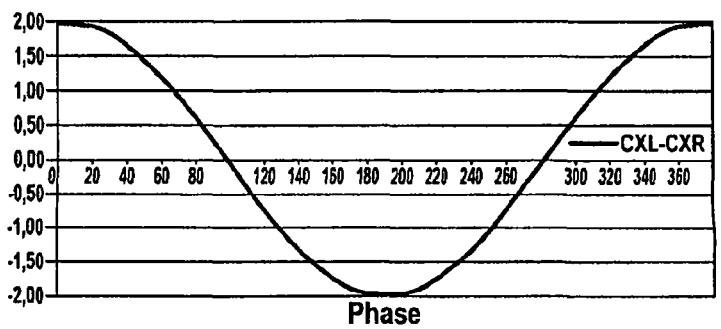

FIGS. 10a to c show an exemplary base element which has two seismic masses 3 and 4 which are embodied in accordance with the seismic mass 3 from FIG. 9, that is to say have a convex side and have a center of gravity which is moved out and is rotated downward through 45° with respect to the plane of the frame (x-y plane). The seismic masses 3 and 4 are each suspended from the right-hand side and left-hand side of the frame 7 on one side on two torsion spring elements 41. In this context, in the undeflected state the base element is in each case symmetrical to a plane running centrally through the center between the base elements 3 and 4, and is perpendicular to the plane (x-y plane) extending through the frame. FIG. 10a illustrates the forces which occur about the z axis at a rotational speed $\Omega_z$. Owing to the drive of seismic masses 3 and 4 in the y direction, the rotational speed $\Omega_z$ results in a Coriolis force $F_c$ in the x direction. Since the center of gravity 50 is moved out and rotated downward in each case with respect to the plane of the frame through an angle of 45° about a suspension point, a deflection force $F_p$ is produced. This acts when there is a left-hand seismic mass 3 in the upward direction and when there is a right-hand seismic mass 4 in the downward direction. Correspondingly, the seismic masses 3 and 4 are deflected inversely oriented with respect to one another in the way illustrated in FIG. 10b. FIG. 10c illustrates the deflection of the seismic masses 3 and 4 in the same direction, that is to say oriented in the same way, upwardly in the z direction, owing to the occurrence of a rotational speed $\Omega_x$ about the x axis. This deflection comes about as a result of the fact that seismic masses 3 and 4 are driven in the y direction, a rotational speed $\Omega_x$ occurs about the x axis, and as a result a Coriolis force $F_c$ acts upwardly on both seismic masses in the z direction.

If the torsion axis about which the center of gravity of a seismic mass can be deflected is parallel to the drive axis and in the plane of the substrate, deflections of the seismic mass owing to the drive or as a function of the movement of the frame in the drive mode are avoided. If this is not the case and this torsion axis is oriented perpendicular to the drive axis, in the drive mode the seismic mass is undesirably deflected in the z direction or oscillates in the z direction.

In alternative exemplary embodiments (not illustrated) to FIGS. 9 and 10, the seismic masses are respectively suspended from spiral spring elements which are elastic in the z direction (FIG. 6b).

FIG. 11 shows various exemplary signal profiles relating to the phase of an exemplary base element according to FIG. 10a for a rotational speed about the z axis in the steady state. FIG. 11a shows the phase-dependant profile of the excitation amplitude, FIG. 11b shows the phase-dependant profile of the relative Coriolis force amplitude in the x direction, FIG. 11c shows the relative z amplitude (relating to the state of rest) of the right-hand seismic mass, FIG. 11d shows the relative z amplitude (relating to the state of rest) of the left-hand seismic mass and FIG. 11e shows the phase-dependant profile of the relative capacitance signal which is a difference signal on the capacitance signal of the left-hand and right-hand seismic masses.

Figure 12A:
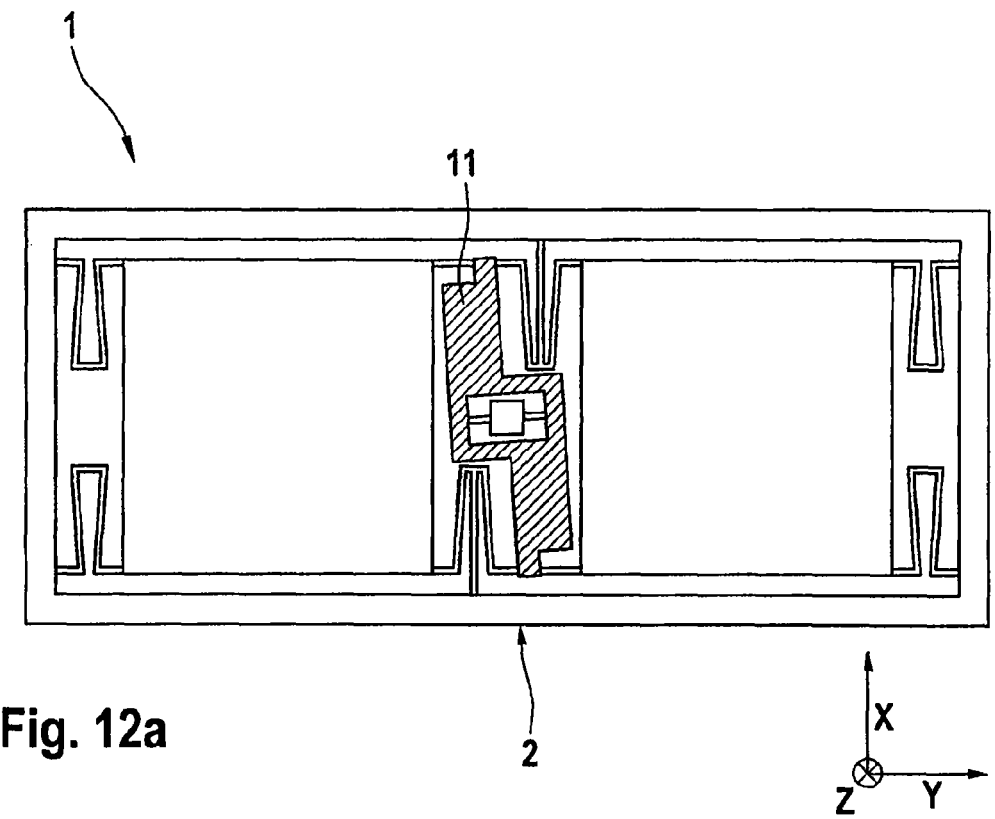
FIG. 12 shows two exemplary embodiments of rotational speed sensors for suppressing parasitic drive modes, once with seismic masses with frames and another time with solid seismic masses without frames.
Figure 12B:
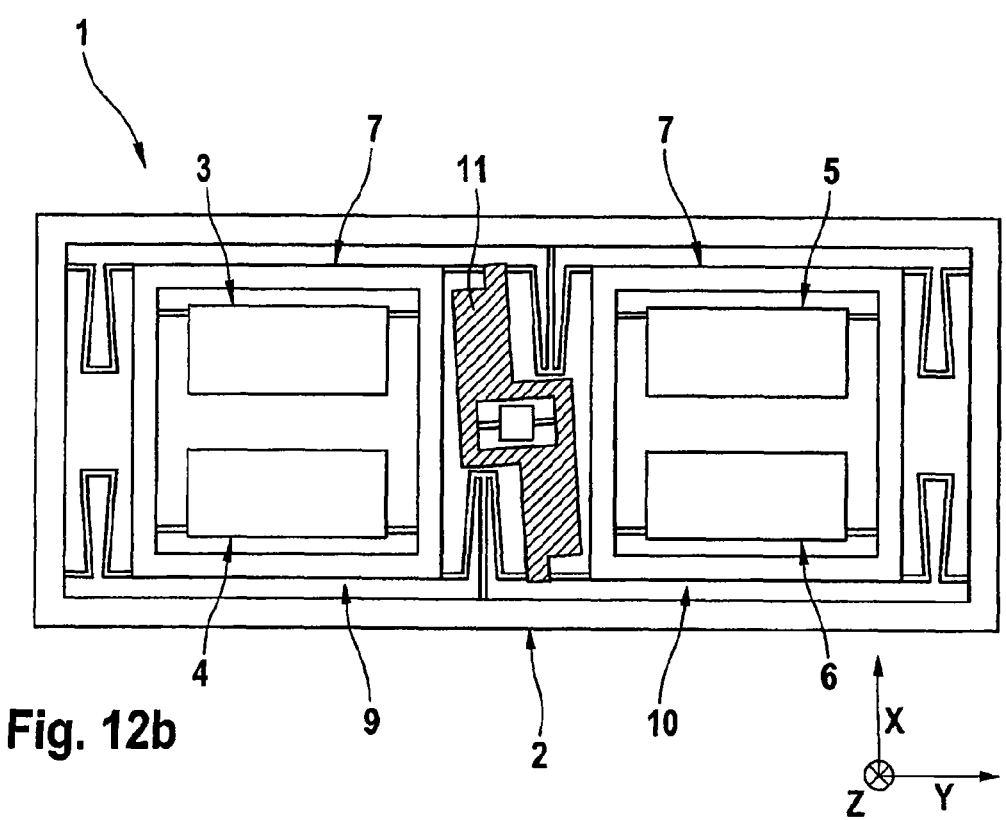

FIG. 12 shows two exemplary embodiments of rotational speed sensors 1 and their masses which oscillate in the y direction in the drive mode by means of a coupling bar 11 which can be subjected to torsion about the z axis by means of a torsion spring and is rigidly suspended from the substrate in the y direction. This suspension of the coupling bar 11 suppresses parasitic modes of the drive modes. In FIG. 12a, seismic masses 23 and 24 are elastically suspended in the y direction by means of meandering spring elements and are rigidly suspended from the substrate 2 in the x direction. FIG. 12b shows base elements 9, 10 which are each suspended elastically in the y direction by means of meandering spring elements and are rigidly suspended from the substrate 2 in the x direction, each with a closed frame 7, from each of which two seismic masses 3, 4, 5, 6 are suspended by means of torsion springs. These torsion springs are rigid in the y and x directions and can be subjected to torsion about the y axis, as a result of which seismic masses 3, 4, 5, 6 are deflected in the z direction in the reading modes.

Figure 13:
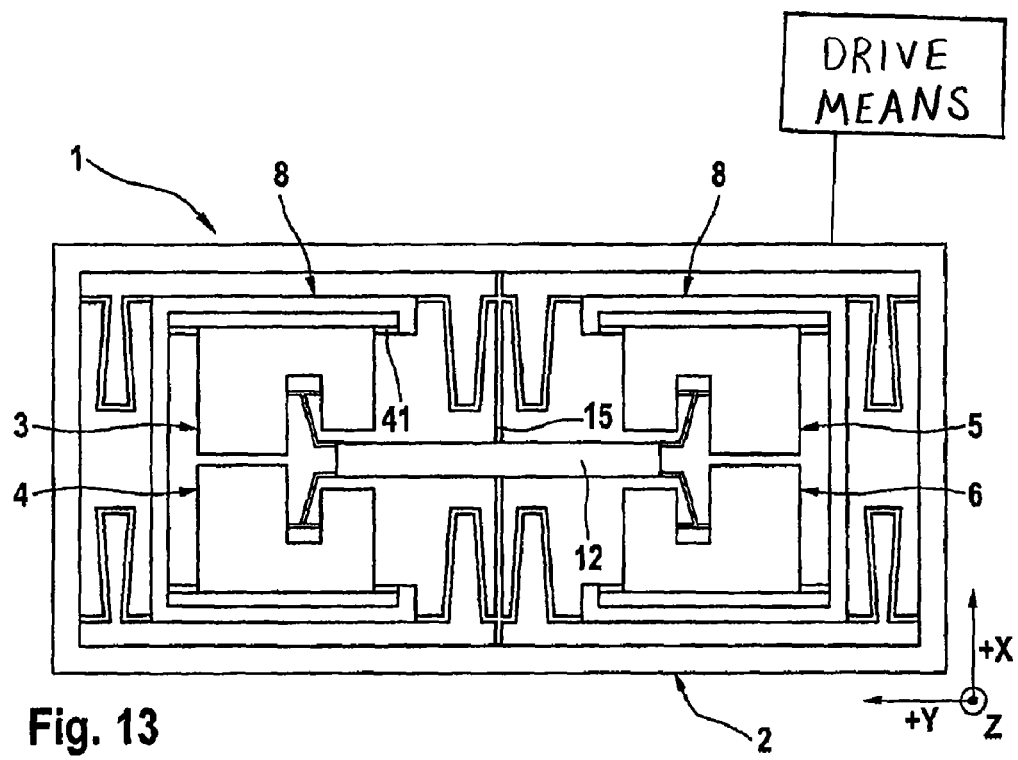
FIG. 13 shows an exemplary x-axis rotational speed sensor with, in each case, two seismic masses per base element.

FIG. 13 shows an exemplary X axis rotational speed sensor 1, that is to say a rotational speed sensor 1 which can sense rotational speeds about the x axis. The latter has two base elements which are each suspended from the substrate 2 by means of spring elements. These spring elements are rigid in the x and z directions and elastic in the y direction. The two base elements are excited in the y direction to undergo antiphase oscillations by drive means (not illustrated symbolically). The two base elements each have a frame 8 which is not completely closed and from each of which two seismic masses 3, 4 and 5, 6, respectively, are suspended by torsion spring elements 41 which essentially permit only torsional deflections about the y axis. The two seismic masses 3, 4 and 5, 6 of a base element are respectively coupled by means of spring elements to one end of a coupling bar 12. The latter is suspended at its center of gravity from the torsion spring 15 which has two anchoring points to the substrate 2. The torsion spring 15 is rigid in the x and z directions and permits torsion about the x axis. This type of suspension of the coupling bar 12 suppresses parasitic modes of the reading modes because no translatory deflections of seismic masses 3, 4 and 5, 6 in the measuring direction (z direction) are permitted by the coupling bar 12 which is suspended in such a way. Instead, deflections of the seismic masses 3, 4 and 5, 6 are guided through the rotational deflections of the coupling bar 12. When a rotational speed occurs about the x axis, the resulting Coriolis force, which acts in the z direction, respectively deflects the two seismic masses of the two base elements in the z direction with respect to the base elements with inverse orientation. In this context, the two seismic masses 3, 4 of the first base element are deflected upward, that is to say for example in the z direction, and the two seismic masses 5, 6 of the second base element are deflected downward in the z direction. For example, each seismic mass 3, 4, 5, 6 has an evaluation unit which senses the respective deflection in the z direction. In the course of the measurement of the rotational speed, the evaluation signals of the seismic masses 3, 4 of a base element are subtracted from the evaluation signals of the seismic masses 5, 6 of the other base element. The resulting difference signal is the measurement signal which includes the information about the rotational speed.

Figure 14:
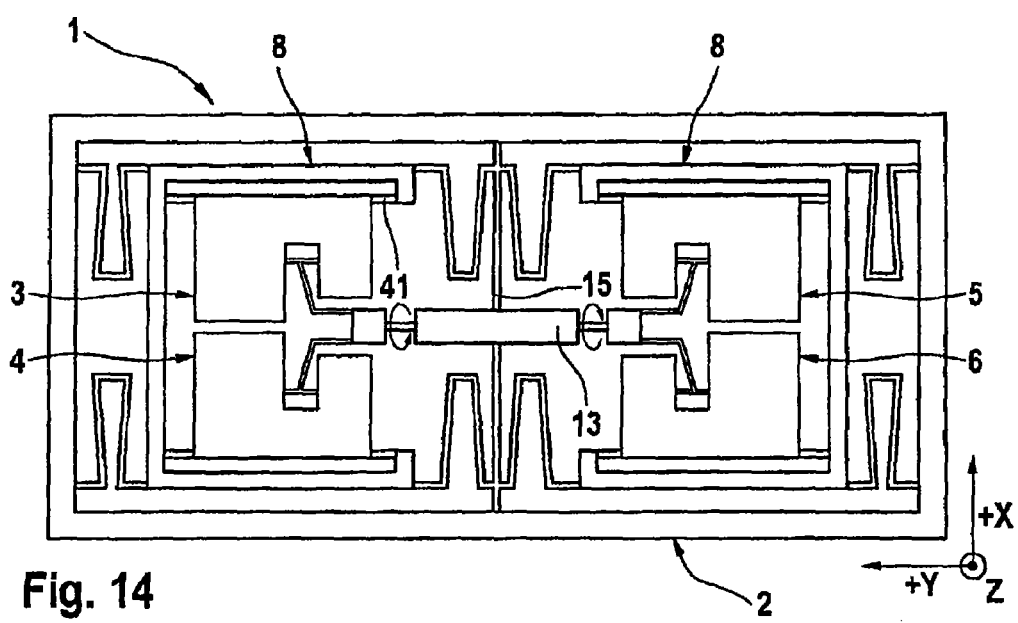
FIG. 14 shows an exemplary embodiment of an X-Z axis rotational speed sensor with four seismic masses and a divided coupling bar.

FIG. 14 shows an exemplary embodiment of a Z axis rotational speed sensor 1, that is to say of a rotational speed sensor 1 which can sense rotational speeds about the z axis. The latter also has two base elements, each with an open frame 8 which is suspended from the substrate 2 by means of meandering spring elements which are rigid in the x and z directions and elastic in the y direction. In each case a drive means (not illustrated) excites the base elements to undergo anti-phase oscillations in the y direction (drive mode). Each base element has two seismic masses 3, 4 and 5, 6, which are each suspended from frames 8 on torsion spring elements 41 which can be subjected to torsion about the y axis and are rigid at least in the y direction. The base elements 3, 4 and 5, 6 are of convex design on the lower side, with the result that their respective center of gravity lies toward the bottom in the z direction, outside the plane extending through the respective frame or outside the right parallelepiped. Such base elements are illustrated, for example, in FIGS. 9 and 10. Base elements 3, 4 and 5, 6 are suspended from one another by means of coupling bar 13. The coupling bar 13 is suspended from torsion spring element 15 with anchoring points on substrate 2, wherein this means of suspension permits torsion about the x axis but does not permit any deflections in the x and z directions. The coupling bar 13 has a central segment at whose center of gravity the coupling bar 13 is suspended from the torsion spring element 15. An edge segment is attached to the ends of the central segment by means of a torsion spring element which permits torsion about the y axis but is of rigid design in the x, y and z directions. These two edge segments of the coupling bar 13 are each coupled to seismic masses 3, 4 and 5, 6 of a base element by means of spring elements. When a rotational speed about the z axis is sensed, a Coriolis force is produced in the x direction on seismic masses 3, 4 and 5, 6 taking into account the driving direction (y direction). Owing to the moved-out center of gravity which has been moved out and rotated, for example, in each case downward through 45° in the z direction out of the plane of the frame with respect to a suspension point, in each case a force, which has a component in the z direction, acts on seismic masses 3, 4 and 5, 6. As a result, the seismic masses are deflected in criss-cross fashion with respect to the base elements and in an inversely oriented manner with respect to one another in each case per base element in the z direction and accordingly oscillate in the reading modes. Seismic masses 3 and 6 are deflected upward in the z direction and seismic masses 4 and 5 are deflected downward in the z direction by means of an exemplary instantaneous recording. A total signal $\psi'$, which includes the information relating to the rotational speed:

$$\psi'=(S3-S4)-(S5-S6)$$

is formed from the signals of the reading devices S3, S4, S5 and S6 of each seismic mass 3, 4 and 5, 6.

This exemplary Z-axis rotational speed sensor 1 can also alternatively be used as an X-Z axis rotational speed sensor, that is to say for sensing a rotational speed about the x axis and a rotational speed about the z axis. In this context, the signal $\psi_z'$ which includes the information relating to the rotational speed about the z axis is calculated as described above ($\psi_z'=(S3-S4)-(S5-S6)$). The signal $\psi_x'$ which includes the information relating to the rotational speed about the x axis is obtained here as:

$$\psi_x'=(S3+S4)-(S5+S6).$$

Figure 15:
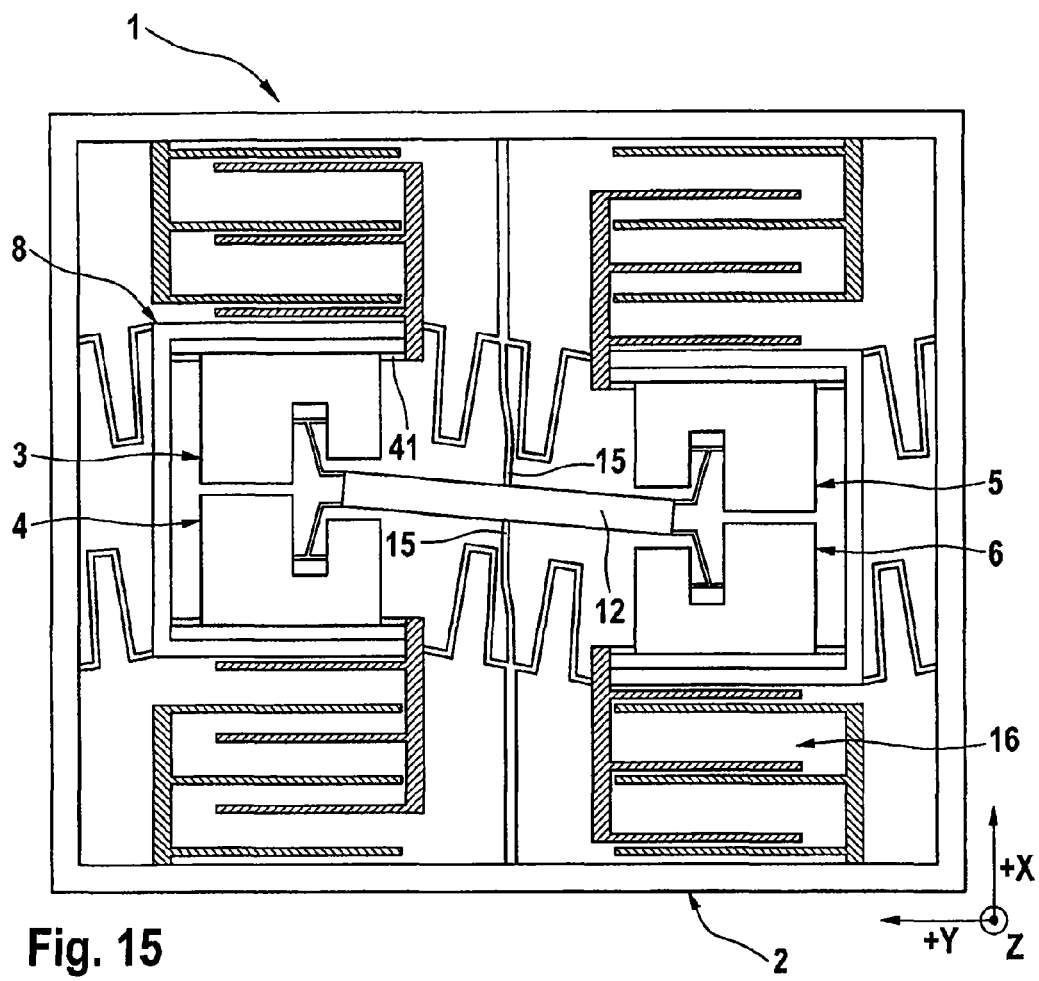
FIG. 15 shows an exemplary X-Z axis rotational speed sensor with a coupling bar which is suspended in such a way that it is capable of being subjected to torsion about the x and z axes.

FIG. 15 illustrates an alternative exemplary embodiment of an X-Z axis rotational speed sensor 1. The latter also has two base elements which each comprise a frame 8 which is suspended from the substrate 2 on spring elements in a rigid fashion in the z direction and elastically in the x and y directions. Drive means which are not illustrated excite the base elements to undergo anti-phase drive modes in the y direction. Furthermore, the rotational speed sensor 1 has four reading devices 16 which can sense deflections of the base elements in the x direction and are arranged on the two sides of each base element in the x direction. In this context, in each case a comb structure of the reading device 16 is connected to the respective frame 8, and another to the substrate 2. Each base element has two seismic masses 3, 4 and 5, 6 which are suspended from the frames 8 by means of torsion spring elements 41 in such a way that they can be subjected to torsion about the y axis and are rigid with respect to the three spatial directions. For example, these seismic masses are embodied according to FIGS. 6 and 7. In one alternative exemplary embodiment (not illustrated) the seismic masses are embodied according to FIG. 10. Seismic masses 3, 4 and 5, 6 are coupled to one another by means of the coupling bar 15.

The coupling bar 12 is suspended from the substrate 2 on the spring element 15 at its center of gravity. This means of suspension, in accordance with the design of the spring element 15 and the way in which it is clamped in, permits the coupling bar 12 to be subjected to torsion about the x axis and the z axis and prevents deflections in the x and z directions. A rotational speed about the x axis brings about a Coriolis force which acts in the z direction and correspondingly deflects the seismic masses in that direction and permits them to oscillate in antiphase with respect to one another in relation to the base elements. For example, in this context seismic masses 3, 4 are deflected upward in the z direction, and seismic masses 5, 6 are deflected downward in the z direction, wherein the time profile of these deflections is registered by reading devices (not illustrated). In contrast, a rotational speed about the z axis brings about a Coriolis force in the x direction. The latter brings about antiphase deflections and modes of the base elements together with seismic masses 3, 4 and 5, 6 in the x direction, which are registered by reading devices 16. The rotational speed about the z axis results here from the difference signal of the reading devices 16 which are assigned to the base elements. In contrast, the rotational speed about the x axis results from the difference signal of the deflection of seismic masses 3, 4 of one base element and the deflection of seismic masses 5, 6 of the other base element.

Figure 16:
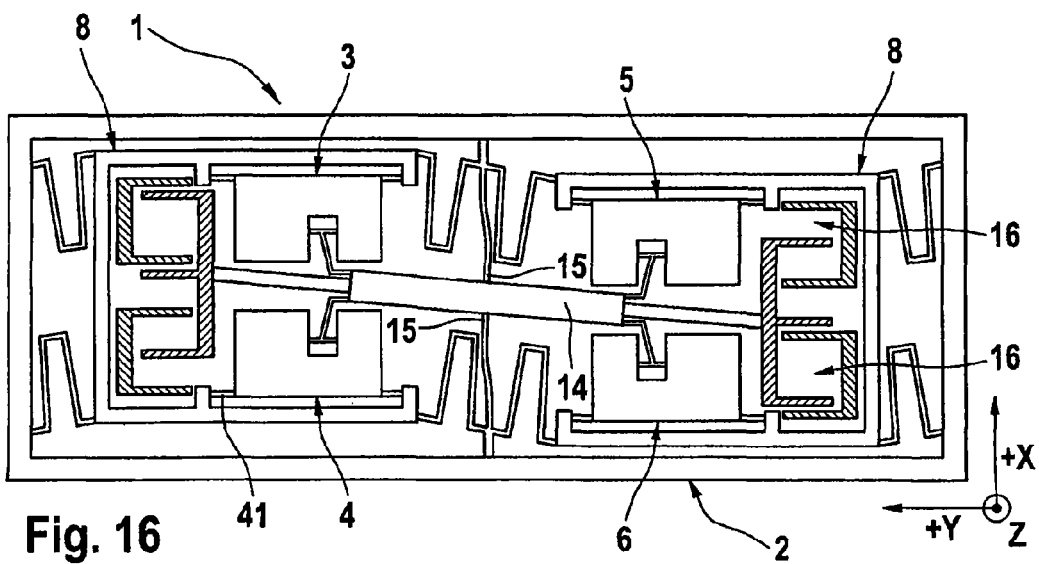
FIG. 16 shows an exemplary embodiment of an X-Z axis rotational speed sensor whose coupling bar is connected at each end in each case directly to the comb structure of a reading device.

The rotational speed sensor 1 which is shown in FIG. 16 is also an X-Z axis rotational speed sensor. It corresponds largely to what is described in FIG. 15. However, reading devices 16 are now arranged at another location, specifically as a prolongation of the coupling bar 14, from the center of the rotational speed sensor 1, in the y direction in each case behind the seismic masses. In this context, these reading devices are permanently connected on each side by one comb structure in each case to the extended end of the coupling bar 14, and by the other comb structure in each case to the substrate 2. These reading devices correspondingly sense the deflections described in FIG. 15 in the x direction, caused by a Coriolis force on the basis of a rotational speed about the z axis.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A rotational speed sensor comprising:
    at least one substrate having a base area oriented parallel to an x-y plane of a Cartesian coordinate system,
    at least two base elements each having a frame, a means for suspending the frame from the at least one substrate, at least one seismic mass and a means for suspending the seismic mass from the frame,
    at least one drive means for driving at least one base element and at least one reading device, wherein the at least one reading device is connected to the at least one substrate for sensing deflections of the seismic masses and/or the frames, and
    at least one coupling bar for coupling the at least two base elements, wherein the coupling bar includes two ends, and each end of the coupling bar is coupled to one or more of the seismic masses, either directly or by one or more spring elements, to suppress translatory deflections of the seismic masses in the same direction in at least one reading mode.

2. The rotational speed sensor as claimed in claim 1, wherein the at least one drive means acts on at least one frame, at least one seismic mass, or at least one frame and at least one seismic mass.

3. The rotational speed sensor as claimed in claim 1, wherein the at least one drive means is configured to drive the at least two base elements in a y-direction, and the rotational speed sensor is configured to sense rotational speeds about an x-axis, a z-axis, or both axes.

4. The rotational speed sensor as claimed in claim 1, wherein the coupling bar is suspended from at least one spring element which is clamped to the substrate and forms at least one anchoring point with the substrate, wherein the spring element is clamped or attached so as to limit translatory deflections of the coupling bar.

5. The rotational speed sensor as claimed in claim 4, wherein the coupling bar is suspended from the at least one spring element in the region of a center of gravity of the coupling bar.

6. The rotational speed sensor as claimed in claim 5, wherein the center of gravity of the coupling bar coincides with a center of gravity of the rotational speed sensor.

7. The rotational speed sensor as claimed in claim 6, wherein the center of gravity of the coupling bar coincides with a center of gravity of the rotational speed sensor with respect to the x-y plane.

8. The rotational speed sensor as claimed in claim 4, wherein the at least one spring element is a torsion spring that permits a rotational deflection of the coupling bar about the z-axis, the x-axis, or the z-axis and the x-axis.

9. The rotational speed sensor as claimed in claim 1, wherein the seismic masses are each suspended so as to be deflectable about a torsion axis, wherein the torsion axis extends essentially parallel to a driving direction.

10. The rotational speed sensor as claimed in claim 1, wherein at least two seismic masses have a center of gravity which lie in a z-direction and outside of a plane extending through a respective frame.

11. The rotational speed sensor as claimed in claim 1, wherein each of the seismic masses is assigned a reading device.

12. The rotational speed sensor as claimed in 1, wherein a sensed rotational speed can be determined from a difference signal of the at least one reading device and another reading device which are each assigned to respective seismic masses of a base element, and from the difference signal of the reading devices that are assigned to different base elements.

13. The rotational speed sensor as claimed in claim 1, said rotational speed sensor being configured to sense a rotational speed about an x-axis,
    wherein the base elements are driven in a y-direction,
    wherein the frames of the base elements are each suspended from the substrate by spring elements which are elastic in the y-direction and substantially rigid in an x-direction and a z-direction,
    the seismic masses of each base element are suspended from a respective frame by spring elements which are configured to (i) permit torsion about a y-axis, (ii) be elastic in the z-direction, or (iii) permit torsion about the y-axis and be elastic in the z-direction,
    the coupling bar is suspended from the substrate by a torsion spring which permits torsion about the x-axis and is rigid in the x-direction and the y-direction.

14. The rotational speed sensor as claimed in claim 1, said rotational speed sensor being configured to sense a rotational speed about an x-axis and a z-axis,
    wherein the base elements are driven in a y-direction,
    wherein the frames of the base elements are each suspended from the substrate by spring elements which are substantially rigid in an x-direction and a z-direction and elastic in the y-direction,
    the seismic masses each have a center of gravity that lies in the z-direction and outside of a plane extending through the respective frame,
    the seismic masses each being suspended from the respective frame by spring elements which (i) substantially permit torsion about a y-axis, (ii) are elastic in the z-direction, or (iii) substantially permit torsion about the y-axis and are elastic in the z-direction,
    the coupling bar is suspended from the substrate by a torsion spring that permits torsion about the x-axis and is rigid in the x-direction and the z-direction, and
    at each end of the coupling bar a separate part of the coupling bar is coupled to a central piece of the coupling bar by a torsion spring, said torsion spring being substantially rigid in the x, y and z-directions and permits torsion about the y-axis, wherein the separate parts of the coupling bar are each coupled to the seismic masses of a respective base element by spring elements.

15. The rotational speed sensor as claimed in claim 1, said rotational speed sensor being configured to sense a rotational speed about an x-axis and a z-axis,
    wherein the base elements are driven in a y-direction, wherein the frames of the base elements are each suspended from the substrate by spring elements that are substantially rigid in a z-direction and elastic in a y-direction and x-direction, the seismic masses of each base element are suspended from the respective frame by spring elements that (i) substantially permit torsion about a y-axis, (ii) are elastic in the z-direction, or (iii) substantially permit torsion about the y-axis and are elastic in the z-direction, and the coupling bar is suspended from the substrate by a torsion spring that permits torsion about the x-axis and the z-axis and is substantially rigid in the x-direction and the z-direction.

16. The rotational speed sensor as claimed in claim 1, wherein said rotational speed sensor is a micro-electric mechanical system (MEMS) or MEMS module.

17. The rotational speed sensor as claimed in claim 16, wherein the MEMS or MEMS module has mechanical and electronic means for (i) connecting to further MEMS modules, (ii) interacting with further MEMS modules, (iii) interacting with at least one electronic signal processing circuit, or (iv) any combination thereof.

18. A method for manufacturing the rotational speed sensor of claim 16, comprising the step of forming micromechanical elements of the rotational speed sensor by means of a manufacturing process for manufacturing micromechanical systems from a substrate.

19. The method of claim 18 comprising the step of forming micromechanical elements of the rotational speed sensor by means of a manufacturing process for manufacturing micromechanical systems from a substrate composed of crystalline silicon, a plurality of layers of semiconductor material, metal, metals, or any combination thereof.

20. The method of claim 18 further comprising the step of forming the rotational speed sensor at least in parts.

* * * * *